United States Patent
Müller et al.

(10) Patent No.: US 11,467,555 B2
(45) Date of Patent: Oct. 11, 2022

(54) METHOD FOR DETERMINATION OF AN EFFECTIVE MACHINE USE OF A MACHINE TOOL AS WELL AS MACHINE TOOL CONFIGURED THEREFORE

(71) Applicant: Gebr. Heller Maschinenfabrik GmbH, Nuertingen (DE)

(72) Inventors: Simone Müller, Stuttgart (DE); Klaus Winkler, Kirchheim unter Teck (DE); Bernd Zapf, Lenningen (DE)

(73) Assignee: GEBR. HELLER MASCHINENFABRIK GMBH, Nürtingen (DE)

( * ) Notice: Subject to any disclaimer, the term of this patent is extended or adjusted under 35 U.S.C. 154(b) by 419 days.

(21) Appl. No.: 16/791,823

(22) Filed: Feb. 14, 2020

(65) Prior Publication Data
US 2020/0264580 A1 Aug. 20, 2020

(30) Foreign Application Priority Data
Feb. 18, 2019 (DE) .................... 10 2019 103 967.3

(51) Int. Cl.
*G05B 19/401* (2006.01)
*G05B 19/4065* (2006.01)
(Continued)

(52) U.S. Cl.
CPC ....... *G05B 19/401* (2013.01); *G05B 19/4061* (2013.01); *G05B 19/4065* (2013.01);
(Continued)

(58) Field of Classification Search
CPC .......... G06Q 30/0645; G06Q 30/0206; G06Q 10/20; G06Q 10/02; G05B 19/401; G05B 19/18; G05B 19/4061; G05B 19/4065
See application file for complete search history.

(56) References Cited

U.S. PATENT DOCUMENTS 8,280,789 B2 10/2012 Menzel
2002/0038172 A1 * 3/2002 Kinugawa .............. G07C 5/085
701/1
(Continued)

FOREIGN PATENT DOCUMENTS

DE   202017103056 U1  10/2018
WO   WO-0193654 A2 *  12/2001 ................ E02F 9/26
WO   WO-2019187065 A1 * 10/2019 ............. G06Q 10/02

OTHER PUBLICATIONS

German Office Action dated May 10, 2021, in corresponding German Application No. 10 2019 103 967.3, with machine English translation (18 pages).

*Primary Examiner* — Ronald D Hartman, Jr.
(74) *Attorney, Agent, or Firm* — Fitch, Even, Tabin & Flannery LLP

(57) ABSTRACT

A method for determination of an effective machine use of a machine tool, as well as a machine tool that is configured for this purpose. The machine tool has multiple machine axes in order to move a workpiece and/or a tool. A rotary drive drives the workpiece or the tool in order to remove material. A control unit of the machine tool determines a use duration characteristic parameter (T) and an output power characteristic parameter (L) and determines therefrom a machine use characteristic parameter (M). The use duration characteristic parameter (T) describes a duration during which the workpiece is machined by the tool. The output power characteristic parameter (L) describes the applied or required power in order to effect the material removal. The machine use characteristic parameter (M) is determined by the control unit, such that it can be transmitted to an external unit for further evaluation or processing.

24 Claims, 3 Drawing Sheets

(51) Int. Cl.
*G05B 19/4061* (2006.01)
*G06Q 20/28* (2012.01)
*G06Q 30/02* (2012.01)
*G06Q 20/26* (2012.01)
*G06Q 30/06* (2012.01)

(52) U.S. Cl.
CPC ............ *G06Q 20/26* (2013.01); *G06Q 20/28* (2013.01); *G06Q 30/0283* (2013.01); *G06Q 30/0645* (2013.01)

(56) References Cited

U.S. PATENT DOCUMENTS

| | | | |
|---|---|---|---|
| 2003/0110667 A1* | 6/2003 | Adachi | G07F 17/0042 37/348 |
| 2017/0274489 A1* | 9/2017 | Baratta | B23D 61/02 |
| 2018/0246236 A1* | 8/2018 | Murata | G01V 1/164 |
| 2019/0106981 A1* | 4/2019 | Hailey | G06Q 30/0283 |
| 2021/0142395 A1* | 5/2021 | Fujima | G06Q 30/0645 |

* cited by examiner

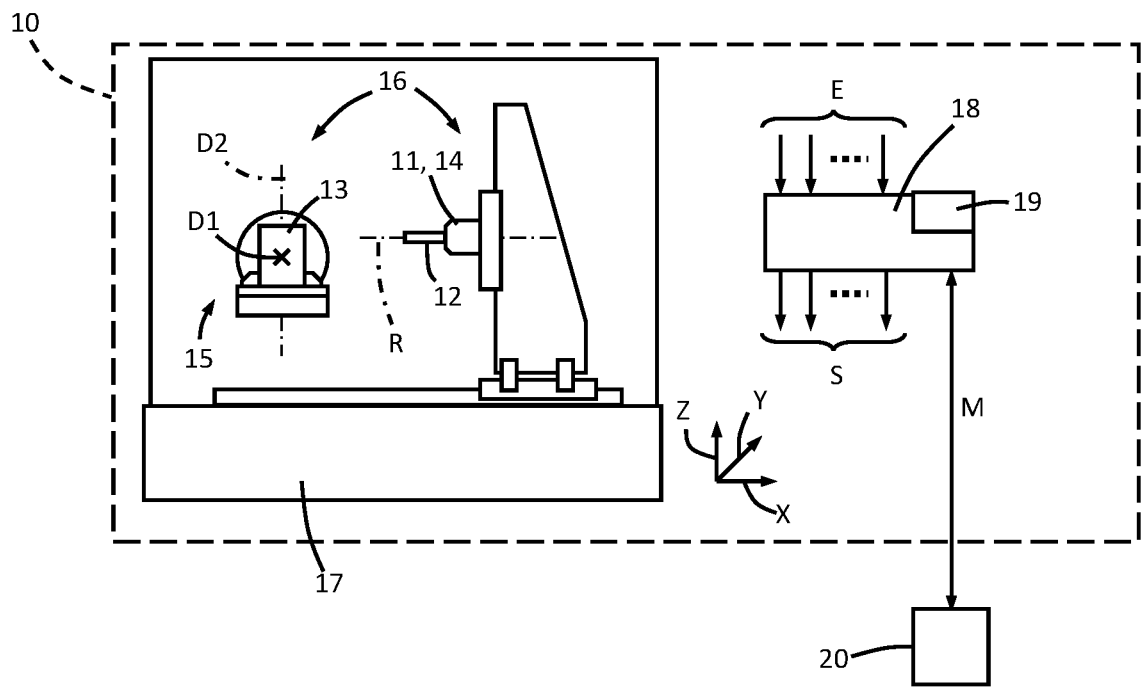
Fig. 1
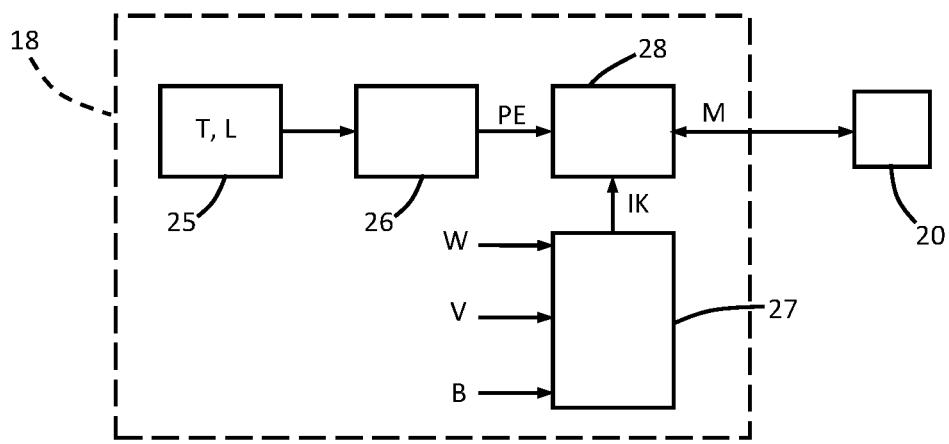
Fig. 2
$$\underset{PM}{[P1 \ P2 \ \cdots \ Pn]} \times \underset{AM}{\begin{bmatrix} A1 \\ A2 \\ \vdots \\ An \end{bmatrix}} = PE$$
Fig. 3

METHOD FOR DETERMINATION OF AN EFFECTIVE MACHINE USE OF A MACHINE TOOL AS WELL AS MACHINE TOOL CONFIGURED THEREFORE

RELATED APPLICATION(S)

This application claims the benefit of German Patent Application No. 10 2019 103 967.3, filed Feb. 18, 2019, the contents of which are incorporated herein by reference as if fully rewritten herein.

TECHNICAL FIELD

The invention refers to a method for determination of an effective machine use of a machine tool as well as a machine tool that is configured for carrying out such a method.

BACKGROUND

Determining of an effective machine use is interesting for many aspects of a machine tool producer. For example, knowledge can be gained about the life expectancy of a machine tool. From the effective machine use it can be determined when a service, maintenance or an exchange of a machine tool has to be expected. The knowledge can be considered in scheduling the service, maintenance and the development of new machine tools. Particularly, if defined response times for service and/or maintenance are concluded in contracts with customers, the knowledge about the effective machine use is advantageous in order to be able to schedule personnel for the service or maintenance of a machine tool in advance. Additionally, the knowledge about the effective machine use can also be used for accounting models, in which the user of the machine tool pays a fee to the manufacturer or provider of the machine tool depending on the effective use.

U.S. Pat. No. 8,280,789 B2 discloses a method for invoicing a machine tool use. The user of the machine tool pays a use fee that depends on a removed volume, the effective machining duration and a trajectory of the machine axes during the machining of the workpiece by means of the machine tool. These data are collected and transmitted to the provider of the machine tool. Based on the collected data, a fee for the use of the machine is calculated.

In doing so, it is problematic that data have to be transmitted to the provider of the machine for this procedure based on which conclusions can be drawn on the configuration of the workpiece. Users of machine tools are usually not willing to give away such data, because secret know-how may be drained from the company. Additionally, the only determination of the removed volume is no sufficiently good measure for the use of the machine, because its wear or degeneration depends among others on what kind of material is machined.

Starting from the prior art, it can be an object of the present invention to provide a method for determination of an effective machine use of a machine tool that considers the effective stress or load of the machine tool during its use more accurately and that avoids the transmission of confidential data. Additionally, a machine tool shall be provided that is configured for the execution of such a method.

SUMMARY

This object is solved by a method for determination of an effective machine use, a machine tool, and a method for determination of a machine tool rent fee as disclosed herein.

In the inventive method a machine use characteristic parameter is determined that characterizes the effective machine use of the machine tool. The machine tool has multiple machine axes. The machine axes are configured to move and/or position a workpiece and/or a tool. The tool and/or the workpiece can be rotationally driven by a rotary drive. Preferably the rotary drive is a tool spindle for rotationally driving the tool about a rotation axis. Alternatively or additionally a workpiece spindle can be present for rotationally driving the workpiece.

The machine tool additionally comprises a control unit. In one embodiment the control unit can also be configured for controlling the machine axes and/or the rotary drive or the tool spindle. The inventive method can be carried out in the control unit or under control of the control unit of the machine tool.

In one method step a use duration characteristic parameter is determined. The use duration characteristic parameter characterizes the duration during which the workpiece is machined by the tool. For example, the operation condition of the tool spindle and/or one or more machine axis can be evaluated and conclusions can be drawn therefrom whether the workpiece is machined or not. The use duration characteristic parameter can additionally or alternatively also be derived from desired data for the workpiece and/or desired data for the movement or the drive of one or more machine axis and the machine spindle, e.g. from available CAD or CAM data.

Additionally, an output power characteristic parameter is determined. The output power characteristic parameter characterizes the power that is provided for machining the workpiece, particularly the power that is output during the time period in which the workpiece is machined. The output power characteristic parameter is thus a parameter that characterizes to which extent the machine tool is stressed at each point of time during the machining of the workpiece. In combination of the output power characteristic parameter and the use duration characteristic parameter a measure for the output energy can be derived that was needed for machining of a workpiece by the machine tool. In doing so it can be distinguished whether the energy was required within a short period of time or within a longer period of time and thus with lower average power for the workpiece machining.

Finally a machine use characteristic parameter is determined by using the output power characteristic parameter and the use duration characteristic parameter. The machine use characteristic parameter is determined in the control unit of the machine tool and provided there for transmission to an external unit. Independent from how the machine use characteristic parameter was determined, the exact machining data, like trajectories of individual machine axes can stay secret and are used for determination of the machine use characteristic parameter, but are preferably not provided for access for the external unit. Preferably the data that are used for determination of the machine use characteristic parameter are protected from access by the external unit.

If in this application a "characteristic parameter" is mentioned, this characteristic parameter can be a scalar, a function, a vector or a matrix, wherein the individual values or elements can be time discrete or time dependent. Preferably the machine use characteristic parameter is a scalar for a considered use time interval of the machine tool.

The transmission of the machine use characteristic parameter to the external unit can be actively triggered by the control unit, e.g. event-dependent or in predetermined time intervals, or the determined machine use characteristic parameter can be requested by the external unit.

In the inventive method not only the manufactured, machined workpiece is considered (e.g. removal volume) in order to determine the machine use characteristic parameter. Rather also the required output power is considered. Particularly, the output power characteristic parameter can consider or characterize a time-dependent progress of the output power during the machining of the workpiece and thus during the effective use duration. This can be achieved, for example, by a continuous time-dependent progress of the output power or alternatively by multiple individual output power characteristic parameters that characterize the time-dependent progress of the provided output power. The output power characteristic parameter can additionally or alternatively comprise any statistic value of the output power, such as at least one local minimum and/or at least one local maximum of the output power and/or an average output power a standard deviation and/or the variance of the output power, etc. It is, for example, possible to determine whether the output power is subject to larger time-dependent variations or whether it deviates only little from the average output power in a machine time interval based on the output power characteristic parameter. In doing so, knowledge about the effective stress or load of the machine tool during a machining of the workpiece can be gained.

It is advantageous, if time duration is determined as use duration characteristic parameter during which a tool spindle rotatingly drives the tool and concurrently a feed motion between the tool and the workpiece occurs. From such a situation it can be concluded on the effective machining of the workpiece. A certain inaccuracy based on the required approaching movement between the tool and the workpiece can be accepted. Alternatively or additionally to the rotation of the tool, also the workpiece can be rotatingly driven. Thus, also a duration can be determined as use duration characteristic parameter during which the spindle rotatingly drives the workpiece or the tool and the workpiece and concurrently a feed motion between the tool and the workpiece occurs.

It is to be noted that the use duration characteristic parameter is not necessarily the accurate determination of the time duration during which a machining of the workpiece effectively occurs, but that the use duration characteristic parameter can also be an estimation of such a time duration.

On one embodiment a time duration can be determined as use duration characteristic parameter during which the tool spindle rotatingly drives the tool and the tool is in engagement with the workpiece the engagement between the tool and the workpiece can be determined of a torque parameter, e.g. that can be measured at the driven tool spindle. Alternatively or additionally, it is also possible evaluate a rotational speed parameter of the tool spindle that characterizes the rotational speed. Based on variations of the rotational speed parameter and/or the rotational speed it can be determined when the engagement of the tool with the workpiece starts and when this engagement ends. For example, a time-dependent progress of the motor current at the drive of the tool spindle can be evaluated for this purpose.

In one embodiment a production matrix can be multiplied with an assessment matrix to obtain a production result characteristic parameter from this multiplication for determination of the machine use characteristic parameter. This production result characteristic parameter is considered for the determination of the machine use characteristic parameter. The production matrix contains multiple production values as matrix elements that characterize the actual condition of the time-dependent progress of the machining of the workpiece in the machine tool. Such production values can be determined and/or estimated from desired data and/or measured by sensors and/or determined in any other manner. The assessment matrix creates a relation between the individual production values of the production matrix and can weigh the different production values relative to each other for example. In doing so, the influence of the different production values on the effective load or stress or degeneration of the machine tool can be considered.

A production matrix and the assessment matrix can also comprise only one line or column and can thus form a production vector or assessment vector respectively.

It is further advantageous, if at least one maintenance characteristic parameter is considered for the determination of the machine use characteristic parameter, wherein the maintenance characteristic parameter characterizes a wear condition and/or a damage condition and/or a maintenance condition of the machine tool.

In one embodiment the maintenance condition of the machine tool can be determined based on a maintenance schedule stored in the control unit of the machine tool. The maintenance schedule can comprise, e.g. maintenance intervals for one or more components of the machine tool. A component of the machine tool can be an individual component and/or a unit or group of components of the machine tool.

In case of non-compliance with the maintenance intervals pre-defined in the maintenance schedule for the one or the more components of the machine tool, a change of the maintenance characteristic parameter can be effected that particularly considers the danger of increased wear due to the non-compliance with the maintenance schedule for example. In doing so, the maintenance characteristic parameter is modified, such that it indicates that the danger of failure or the requirement of maintenance increases and thus the machine tool is currently subject to an increased wear or an increased degeneration, as in the case in which the maintenance schedule was observed.

Preferably the maintenance activity and/or at least one exchanged component and/or at least one exchanged operating fluid of the machine tool is registered in the control unit during or after the conducted maintenance. The registration is preferably carried out automatically, e.g. by means of a respective sensor system that is configured to detect the replacement and/or insertion of one or more new components. The maintenance activity required for this can be stored or can be inserted by the maintenance personnel. Based on the registration of the activity and/or the at least one replaced component of the machine tool, a change or adaption of the maintenance characteristic parameter can be effected. For example in doing so, a stored maintenance schedule can be adapted. In the context of such a maintenance wear and tear parts or failed parts can be replaced, such as seals, bearings, etc. or operating fluids, such as cooling medium or lubricating oil can be replaced.

Also the replacement of operating fluids can be registered automatically or manually. For automatic detection of a replacement of an operating fluid a sensor can be arranged at a respective inlet opening, such as an inlet valve that detects the infilling of a new operating fluid for example. Additionally or alternatively, the extraction of the so far used operating fluid at an outlet opening or an outlet valve can be sensorically detected.

For the determination of the maintenance characteristic parameter a wear condition of at least one component of the machine tool can be additionally considered. For example, the wear condition can be directly measured by sensors or can be derived from sensor data and/or control data that are available in the machine tool. For example, a play between two components can be determined in this manner and therefrom the wear of at least one of these components can be determined. For example, the components can be a driven component and like an output side component that is drivingly connected with the driven component. Also a play between a guide and a guided component can be detected by at least one sensor and therefrom a wear condition can be derived. Additionally or alternatively, the wear condition can also be determined from historical control data that are stored in the control unit.

It is also advantageous, if a collision detection function is executed by the control unit of the machine tool. In the context of the collision detection function actual acceleration values of one or more machine axes can be determined, e.g. each of which can be compared with a predetermined limit value. If the limit value is exceeded, the occurrence of a collision can be concluded. The determination of the collision can be considered for the determination of the damage condition and the damage condition in turn can be considered for the determination of the maintenance characteristic parameter. The number of collisions characterizes, for example a degradation of the condition of the machine tool.

The output power characteristic parameter can characterize, e.g. a spindle power of the tool spindle and/or a feed power for a feed movement between the tool and the workpiece while the tool spindle rotates. Particularly an output power characteristic parameter can be determined from the sum of the spindle power and the feed power, wherein the output power characteristic parameter characterizes the power that is applied by the machine tool during the machining of the workpiece.

Preferably desired data of the completely machined workpiece and/or actual data of the machined workpiece and/or initial data of the non-machined workpiece are considered for the determination of the output power characteristic parameter and/or the use duration characteristic parameter. Particularly by a comparison of the initial data of the non-machined workpiece with the actual data of the partly or completely machined workpiece or by comparison of the initial data with desired data for the completely machined workpiece, the output power characteristic parameter and/or the use duration characteristic parameter can be determined. For this purpose a machining method progress can be determined particularly, e.g. among other things, by at least a comparison of the desired data for the completely machined workpiece with the actual condition of the partly machined workpiece or the initial data of the non-machined workpiece. From the machining method progress in turn, the output power characteristic parameter and/or the use duration characteristic parameter can be determined. The machining method progress comprises the movements of the machine axes and the drive condition of the tool spindle, such that therefrom the output power characteristic parameter as well as the use duration characteristic parameter can be derived.

Also a material parameter characterizing the hardness of the material of the workpiece to be machined can be considered for the determination of the output power characteristic parameter. For example, this material parameter can be preset in the control unit.

The desired data for the completely machined workpiece can be CAD data and/or CAM data for the workpiece that are, for example, stored in the control unit.

In a preferred embodiment of the method a hash code value is calculated for each machine use characteristic parameter using a cryptographic hash function. The cryptographic hash code function may use a secret key as second input or can be keyless. For example a use characteristic parameter can be determined periodically for each time period at least during the operation of the machine tool. A time period can be selected, e.g. in the range of some milliseconds to some seconds as desired. The smaller the selected time period is, the more precise is the determination of the effective machine use based on the machine use characteristic parameters.

The calculation of the hash code value is executed in the control unit of the machine tool or in the external unit or preferably in the control unit and in addition in the external unit. Thus, a hash code value can be stored in the control unit and in the external unit for each determined machine use characteristic parameter.

It is preferred that a block chain is created based on the calculated hash code values. The block chain can contain one block for each hash code value. The block chain is preferably created and stored in the external unit.

Alternatively or additionally to the hash code value each block of the block chain may contain the machine use characteristic parameter or any other value depending thereon.

The external unit can contain one or more computing devices that are in communication connection with each other, e.g. a cloud system. One or more computing devices can form computing nodes that may be used for calculating the hash code values and for creating the block chain. One of the computing nodes that can participate in creating the block chain is the control unit of the machine tool. Other computing nodes that may contribute to creating the block chain are, for example, one or more computing devices of a provider of the machine tool, one or more computing devices of a user of the machine tool, one or more computing devices of an insurance company, one or more computing devices of a bank, etc.

An inventive machine tool comprises a control unit that is configured to execute one or more embodiments of the above disclosed method.

Some customers prefer to rent a machine tool instead of buying it. Determining the effective machine use of the machine tool can be a basis for calculating a machine tool rent fee containing a use-dependent fee component. In addition to the use-dependent fee, the machine tool rent fee may also contain at least one lump sum, e.g. an initial fee for the installation and/or set-up of the machine tool at the customer site. The machine tool rent fee may also contain a lump sum in the form of a terminal fee for removal and/or disassembly of the machine tool, if the rent is terminated.

In one preferred embodiment the machine tool rent fee can also include periodic fee, preferably a monthly fee that can contain a basic fee that has to be paid in addition to the use-dependent fee.

Preferably the use-dependent fee is calculated based on a parameter that characterizes the effective use of the machine tool and that was calculated based on sensor and/or control data available in the machine tool. Preferably the production result characteristic parameter and/or the maintenance characteristic parameter. Preferably the machine use characteristic parameter is used for calculating the use-dependent fee.

It is preferred, if the use-dependent fee is calculated in the external unit outside the machine tool. Preferably the use-dependent fee is calculated in a computing device of the provider of the machine tool.

The provider of the machine tool may directly debit the fees from a customers' account, preferably a prepaid account. The initial fee for the installation of the machine tool is preferably directly debited from the prepaid account prior to the installation of the machine tool. Additionally or alternatively, the terminal fee may also be directly debited from the prepaid account of the customer prior to the installation of the machine tool, because the removal or disassembly of the machine tool from the customer site is usually necessary anyway. However, the direct debiting of the terminal fee can also be made at a later point of time, preferably before the rent terminates. The periodic fee (e.g. monthly fee) and/or the use-dependent fee is preferably directly debited from the prepaid account at the beginning of each period (e.g. month).

The use-dependent fee is preferably directly debited from the customers' prepaid account by the provider of the machine tool. The customer has to balance the account such that the credit corresponds at least to the use-dependent fee for one subsequent use period. For example the provider and the user of the machine tool define use periods in the range of 50 hours to 150 hours, preferably 100 hours. Before the actual use period or use interval ends the use-dependent fee may be directly debited from the customers' account and the customer/user of the machine tool has to balance the prepaid account in order to be allowed to use the machine tool during the next pre-defined use period (e.g. 100 hours).

The rent contract between the provider of the machine tool and the user of the machine tool may contain an insurance and/or a warranty. The machine tool rent fee then includes all service and maintenance that is necessary until the rent contract or rent period terminates. The maximum rent period can be couple of years, e.g. 3 years. After the rent period has terminated, the provider is able to sell the machine tool as used machine tool. If the user decides to buy the used machine tool, the terminal fee may not become due or may be reduced.

The insurance terms and/or conditions of the rent contract may include an insurance against damages of the machine tool or its components depending on erroneous or non-conforming use of the machine tool, e.g. if collisions are created between moveable machine components.

The use-dependent rent fee can be defined to correspond to at least a minimum fee in order to avoid that a customer or user is renting a machine tool without using it in order to be able to buy the machine tool as used machine tool cheaper after the rent terminates. The provider may monitor the effective use of the machine tool and inform the user, if the minimum use of the machine tool is probably not reached until the end of the rent. Both parties may then agree upon a further procedure, e.g. measures can be undertaken to reduce the tooling time of the machine tool in order to increase the effective use of the machine tool at the customer site.

Additionally or alternatively, it is also possible that the user or customer is entitled to a bonus at the termination of the rent, if the effective use of the machine tool exceeds the defined threshold that may be equal to the defined minimum use of the machine tool.

Based on data stored in the control unit of the machine and/or in the external unit, a prediction can be made with regard to maintenance and/or service and/or repair of the machine tool. Based on this prediction, the maintenance and/or service and/or repair may be scheduled such that the customers' or users' production is not hindered and production downtimes are reduced to a minimum. For example such actions can be scheduled to times where the machine tool is not used (night time, weekend, etc.).

The production result characteristic parameter and/or the maintenance characteristic parameter can thus describe a monetary value respectively. The production result characteristic parameter can correspond to a monetary value that characterizes the effective machine use of the machine tool and can thus also be a basis for a use-dependent fee of a machine tool rent fee. The maintenance characteristic parameter can characterize a monetary value that characterizes the condition of the machine tool dependent from its wear to date and particularly comprises the wear condition and/or the damaged condition and/or the maintenance condition of the machine tool. The larger the wear of the machine tool is, the larger can be the fee that is debited for this and that can be characterized by the maintenance characteristic parameter.

The debiting of fees for the effective machine use as well as the wear or the degradation of the machine tool are only one possibility how the determined characteristic parameters can be used. It is to be noted that it is sufficient to use only data that characterize the effective machine use without the requirement to access potentially secret production data of the machine user for this purpose. The control unit provides a machine use characteristic parameter for an external unit that comprises, e.g. the production result characteristic parameter and as an option the maintenance characteristic parameter individually or concatenated or combined with each other. Detailed information about the number, the form and the configuration of the machined workpieces are not necessary and particularly not provided for the transmission to the external unit. Additional data measured or determined in the control unit of the machine tool may be transmitted to the external unit only with consent of the customer/user of the machine tool.

BRIEF DESCRIPTION OF THE DRAWINGS

Preferred embodiments of the invention can be derived from the dependent claims, the description and the drawings. In the following preferred embodiments of the invention are discussed in detail with reference to the attached drawings. The drawings show:

FIG. 1 a schematic block diagram like illustration of an embodiment of a machine tool as well as an external unit and with a communication connection between the external unit and the machine tool, FIG. 2 a block diagram of an embodiment for determination of a machine use characteristic parameter in a control unit of the machine tool of FIG. 1, FIG. 3 an embodiment for a production matrix and an assessment matrix for determination of a production result characteristic parameter, FIG. 4 a flow diagram of an embodiment of a method according to the present invention, FIG. 5 a schematic block diagram illustrating the interaction of parties participating in a machine tool rent process and FIG. 6 a schematic illustration of a blockchain created in the control unit of a machine tool and/or an external unit.

DETAILED DESCRIPTION

Figure 4:
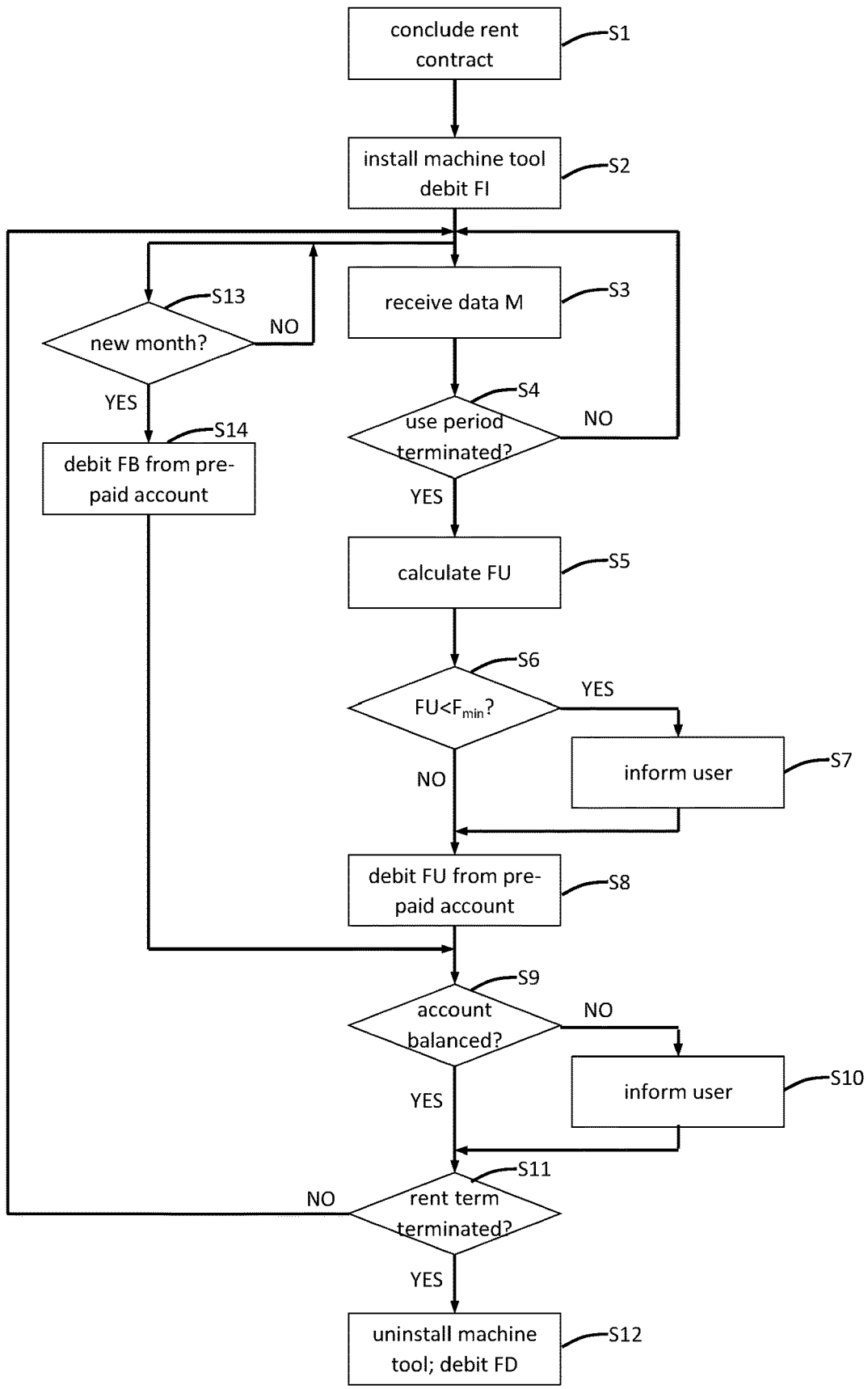

In the manner of a block diagram FIG. 1 highly schematically illustrates an embodiment of a machine tool 10.

The machine tool 10 has a rotary drive 11 that is configured for rotating a tool 12 or a workpiece 13 about a rotation axis R. A rotation movement is a rotation about the rotation axis with at least one complete rotation. The rotation is preferably carried out continuously without interruption. Particularly the rotation about the rotation axis R is a rotary movement with a preset rotational speed, wherein a plurality of complete rotations are carried out without interruption. For example, a constant desired rotational speed can be preset.

In the embodiment the rotary drive 11 is configured as tool spindle 14 that is configured for holding the tool 12. The tool 12 is particularly a chip-removing tool, such as a milling tool, a drilling tool or the like.

For holding the workpiece 13, a workpiece clamping device 15 is provided. For example, the workpiece clamping device 15 can comprise multiple clamping jaws in order to hold the workpiece 13.

The machine tool 10 comprises multiple machine axes 16 in order to move and/or position the tool 12 and/or the workpiece 13 relative to a machine base 17. A machine coordinate system with an x-direction, a y-direction and a z-direction is defined stationary relative to the machine base 17. The machine coordinate system is a Cartesian coordinate system in the embodiment. The machine axes 16 can be configured as linear machine axes or rotary axes. The number of the machine axes 16 can vary depending on the configuration of the machine tool 10. In the embodiment illustrated in FIG. 1, three linear machine axes 16 are present in order to move the tool 12 or the tool spindle 14 respectively in x-direction, y-direction and z-direction with reference to the machine coordinate system. Additionally, two rotary axes are present, in order to rotate the workpiece 13 about a first rotation axis D1 that extends in y-direction in the embodiment. In case of a rotation about the first rotation axis D1, the workpiece clamping device 15 is pivoted about the first rotation axis D1. A second rotation axis D2 is present at the workpiece clamping device 15 in order to rotate the workpiece 13 about the second rotation axis D2 that is orientated orthogonal to the first rotation axis D1 and extends parallel to the z-axis in the position illustrated in FIG. 1. Depending on the rotary position about the first rotation axis D1, the orientation of the second rotation axis D2 changes and can take a position within the x-z-plane. By means of the two rotation axes D1, D2 a five-side machining of the workpiece 13 is allowed.

It is again indicated here that the number of machine axes 16 that can be configured as rotary axes or linear axes can vary and can depend on the kind of machine tool 10. Preferably at least four or five machine axes 16 are present.

The machine tool 10 has additionally a control unit 18. The control unit 18 can comprise an internal memory 19. Different to the illustrated embodiment, the memory 19 can be provided alternatively or additionally also outside of the control unit 18 in the machine tool 10.

Input data E are provided to the control unit 18. The input data E can be desired data that characterize the completely machined workpiece 13, desired data that characterize the condition and/or the movement of the tool spindle 14 and/or one or more of the machine axes 16 and/or sensor data or actual data that characterize the actual condition and/or the actual position and/or the actual movement of the tool 12 and/or the workpiece 13 and/or any component of the machine tool 10. In the embodiment the control unit 18 is configured to control the tool spindle 14 and the machine axes 16 and creates one or more control signals S for this purpose.

In the embodiment the control unit 18 is configured to determine a machine use characteristic parameter M that characterizes the effective machine use of the machine tool 10. The machine use characteristic parameter M is provided by the control unit 18 within the machine tool 10 for transmission to an external unit 20. For this purpose the machine tool 10 or the control unit 18 can comprise a transmission interface to the external unit 20 that can be configured for wireless or wired communication connection.

Based on the machine use characteristic parameter M the external unit 20 can determine the extent of the actual use of the machine tool 10 in the past and can schedule or initiate measures from this determination. For example, based on the machine use characteristic parameter M, expected service or maintenance work or also the complete replacement of a machine tool 10 can be estimated and scheduled based on the machine use characteristic parameter M. Additionally or alternatively, also a fee for the machine user can be determined based on the machine use characteristic parameter M. The fee is based on the actual effective use of the machine tool 10. This can be appropriate or advantageous, of a machine tool 10 is rented or leased.

FIG. 2 schematically illustrates the determination of the machine use characteristic parameter M in an embodiment. By means of the control unit 18, a use duration characteristic parameter T as well as an output power characteristic parameter L is determined (first block 25 in FIG. 2). In a second block 26 the use duration characteristic parameter T as well as the output power characteristic parameter L are concatenated or combined with each other in order to determine a production result characteristic parameter PE therefrom that is considered for the determination of the machine use characteristic parameter M.

In a third block 27 a maintenance characteristic parameter IK is determined that characterizes the maintenance condition of the machine tool 10 and that is considered for the determination of the machine use characteristic parameter M.

In a fourth block 28 the machine use characteristic parameter M is determined depending on the production result characteristic parameter PE and the maintenance characteristic parameter IK according to the example.

The output power characteristic parameter L characterizes the applied power during the machining of the workpiece 13 by the machine tool 10. The output power characteristic parameter L can be determined, e.g. from the sum of a rotary drive power from the rotary drive 11 or the tool spindle 14 as well as a feed power for the feed movement between the tool 12 and the workpiece 13. In the embodiment illustrated in FIG. 1 the feed movement is particularly created by the machine axis 16 that moves the tool 12 in z-direction. Depending from a configuration of the machine axes 16 of the machine tool 10, the feed movement can be effected by one or more arbitrary machine axes.

The rotary drive power and/or the feed power can be determined by evaluating the respective motor currents and/or motor voltages for example.

In one embodiment the use duration characteristic parameter T is an estimated, calculated or otherwise determined time duration that characterizes the actual machining duration of the workpiece 13 by the tool 12. In an embodiment the use duration characteristic parameter T can be determined by determination of a time duration during which the rotary drive 11 or the tool spindle 14 drives the tool 12 rotatingly while concurrently a feed movement, e.g. in z-direction, is carried out between the tool 12 and the workpiece 13.

Additionally or alternatively, a time duration can be determined as use duration characteristic parameter T during which the rotary drive 11 and according to the example, the tool spindle 14 rotatingly drives the tool 12 while concurrently an engagement between the tool 12 and the workpiece 13 is determined. For determination of the engagement between the tool 12 and the workpiece 13 the torque of the rotary drive 11 and/or the rotational speed of the rotary drive 11 can be evaluated for example. As soon as the tool 12 engages the workpiece 13, an increase of the torque is necessary for maintaining the desired rotational speed. On the other hand, the torque required for the maintenance of the rotational speed decreases again, if the tool 12 and the workpiece 13 are disengaged. Based on such an evaluation, the time duration can be determined during which the tool 12 and the workpiece 13 are actually engaged with each other. For example, the torque can be characterized by a torque characteristic parameter, such as the motor current of the rotary drive 11.

It is additionally or alternatively also possible to use desired data for the completely machined workpiece 13 and/or actual data of the actually partly machined workpiece 13 or the completely machined workpiece 13, as well as initial data of the non-machined workpiece 13 in order to determine the output power characteristic parameter L and/or the use duration characteristic parameter T. For example, based on the initial data, particularly the initial dimensions of the non-machined workpiece, as well as desired data for the completely machined workpiece 13, a machining method progress can be determined that can be stored or preset automatically and/or manually by a user in the control unit 18 of the machine tool 10. Based on the machining method progress, the use duration characteristic parameter T can be determined in turn that describes the actual time duration during which the tool 12 machines the workpiece 13, particularly by removing material. Additionally or alternatively the output power characteristic parameter L for the power applied during the machining of the workpiece 13 can be determined from the material removal.

The different approaches for the determination of the output power characteristic parameter L and the use duration characteristic parameter T can be used alternatively or in combination. If different values for the output power characteristic parameter L or the use duration characteristic parameter T are obtained by two different determination methods, either one of the values can be used that seemed to be more plausible or the individually determined values or characteristic parameters can be concatenated or combined with each other in order to calculate an average value or a weighted average value.

For the determination of the output power characteristic parameter L a characteristic of the workpiece can be considered additionally to the machining method progress, e.g. a material parameter that characterizes the hardness of the material to be machined of the workpiece 13. This material parameter specifies or defines the required power and/or the required duration in addition to the volume to be removed for removing this pre-defined volume of material.

In an embodiment the use duration characteristic parameter T and/or the output power characteristic parameter L are characterized by a production matrix PM that comprises multiple production values P1, P2, . . . , Pn. In the embodiment the production matrix has the form of a vector (FIG. 3). The production matrix PM can comprise in one case the use duration characteristic parameter T and the output power characteristic parameter L in the form of one production value P1, P2 respectively. Alternatively, multiple production values Pi with i=1 . . . n can characterize the use duration characteristic parameter T or the output power characteristic parameter L respectively. For example, the output power characteristic parameter L can be defined by multiple power values, such as the average output power, the maximum output power, the minimum output power, the standard deviation of the output power, the variance of the output power or an arbitrary combination of multiple of the above-mentioned power values. Each of these individual power values can be a production value in the production matrix PM.

The production matrix PM can also comprise more than one use duration characteristic parameter. For example, individual use duration characteristic parameters T for different kinds of machining of the workpiece 13 can be contained in the production matrix, e.g. a use duration characteristic parameter T for the machining of the workpiece 13 with a first tool 12, as well as additional use duration characteristic parameters T for the machining of the workpiece 13 with another tool 12. In this manner stresses or loads of the machine tool 10 for the use of different tools 12 can be considered. Each use duration characteristic parameter T can be a matrix element or a production value Pi in the production matrix PM respectively. Additionally or alternatively, one use duration characteristic parameter T can be determined for each of one or more machining time intervals.

The individual production values P1-Pn are concatenated or combined with each other in block 26, e.g. by means of an assessment matrix AM. The assessment matrix AM comprises assessment elements A1, A2, . . . , An. In the example illustrated in FIG. 3 the assessment matrix AM is formed by a vector. It is appreciated that the production matrix PM as well as the assessment matrix AM can comprise more than one line or column respectively. The number of elements per line or column can vary.

In the second block 26 the production matrix PM and the assessment matrix AM are combined and, for example, multiplied in order to determine the production result characteristic parameter PE that characterizes the machine use based on the production or machining of workpieces. The production result characteristic parameter PE is provided to the fourth block 28.

In the third block 27 a maintenance condition W, a wear condition V, as well as a damage condition D of the machine tool 10 are considered for determination of the maintenance characteristic parameter IK. Also only one or more of the mentioned conditions can be considered for determination of the maintenance characteristic parameter IK.

The maintenance condition W can be determined based on a maintenance schedule stored in the control unit 18 for example. Particularly an adaption or amendment of the maintenance characteristic parameter IK can be initiated, if the maintenance intervals for maintenance of one or more components of the machine tool 10 defined in the maintenance schedule are not observed. The non-compliance of the maintenance schedule increases the danger that an increased wear occurs, if the operation of the machine tool 10 is continued, which can be considered by the adaption of the maintenance characteristic parameter IK.

Additionally or alternatively, an activity in the context of maintenance and/or a replacement of at least one component of the machine tool 10 can be registered in the control unit 18 by a respective adaption or modification of the maintenance characteristic parameter IK. An executed maintenance or the exchange of components and/or operating fluids of the machine tool 10 can improve the condition of the machine tool 10 and reduce the wear or the degradation during further operation. This can be reflected by a respective change of the maintenance characteristic parameter IK.

Additionally the machine tool 10 can contain an automatic monitoring of the wear condition V of at least one component of the machine tool 10. For example, the play between two components at a machine axis 16 or the rotary drive 11 that can be moved relative to each other can be measured or determined. In doing so, the actually present wear can be determined, for example, and can be considered for the determination of the maintenance characteristic parameter IK. This is because the actual occurring wear can depend on external conditions in addition to the extent of use, such as the temperature, the pollution of the ambient air with dust or other particles and so on.

In one embodiment the control unit 18 can also be configured to execute a collision detection function. For this purpose actual acceleration values of one or more machine axes 16 can be measured or can be determined based on characteristic parameters of the respective drive of the machine axis 16. The at least one actual acceleration value can be compared with an associated limit value and from this comparison it can be derived whether the actual acceleration is within an allowed range or not. If the actual acceleration is above the limit value and thus in a non-allowed range, a conclusion can be drawn that a collision during the movement of the machine axis. A determined collision can then be considered for the determination of a damage condition B of the machine tool 10 and the damage condition B can be in turn considered for the determination of the maintenance characteristic parameter IK. Additionally or alternatively, also the difference amount between the actual acceleration value and the associated limit value can be considered for the determination of the damage condition B and not only whether the actual acceleration value has exceeded the limit value. This difference amount is characteristic for the severity of the collision.

In the fourth block 28 the production result characteristic parameter PE as well as the maintenance characteristic parameter IK are concatenated or combined with each other in order to determine therefrom the machine use characteristic parameter M. In the simplest case the production result characteristic parameter PE and the maintenance characteristic parameter IK can be added or multiplied. Also a weighted addition or another arbitrary mathematical combination can be used for calculating the machine use characteristic parameter M.

Figure 5:
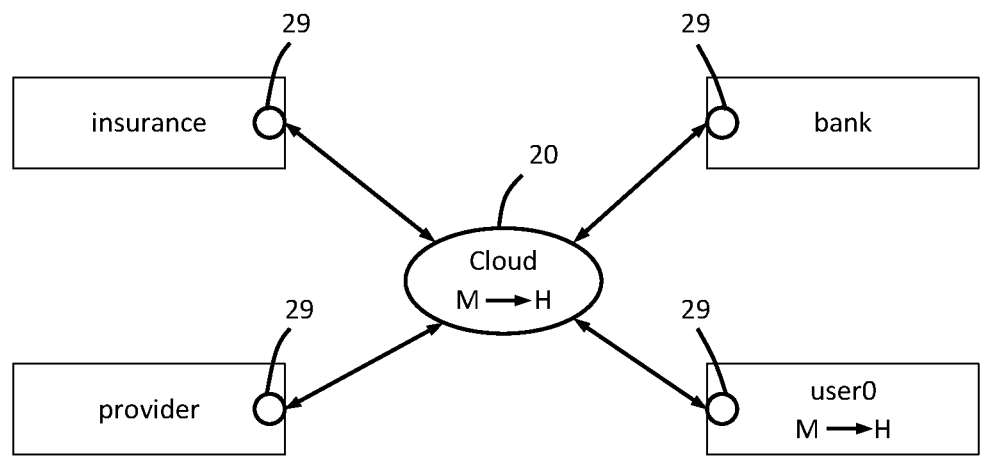

The machine tool 10 may be subject to a rent contract between a provider and a user or customer. The user or customer does not have to buy the machine tool 10 in this case, but can rent the machine tool 10 and use it at his/her own site. The rent contract may contain an insurance against unintentional damage of the machine tool 10 by the user or customer. A bank may participate to provide a customer account, preferably a prepaid customer account from which the provider may directly debit the necessary fees or fee components as defined in the rent contract. FIG. 5 illustrates the possible parties of such a rent process.

FIG. 5 also discloses that the external unit 20 may be one or more computing devices that are in communication connection with each other and with the control unit 18 of the machine tool. It is possible that one or more parties of the rent process provide a computing node 29 comprising one or more computing devices, wherein each computing node 29 may provide computing power needed for the determination of the effective use of the machine tool 10 and for debiting one or more fees of a total machine tool rent fee.

According to the preferred embodiment, one component of the total machine tool rent fee is a use-dependent fee FU that is determined depending from the effective use of the machine tool 10. For this determination the machine use characteristic parameter M is preferably used that already characterizes the effective use of the machine tool 10. Additionally or alternatively one or more of the data that is used for determination, the machine use characteristic parameter M can be used for determining the use-dependent fee FU.

The calculation of the use-dependent fee FU and/or any other fee that is part of the total machine tool rent fee is made in the external unit 20, preferably in one or more computing devices of the computing node 29 of the provider. The machine tool rent fee calculation can be provided for access in the cloud such that the user of the machine tool 10 and/or other participants of the rent process (e.g. as illustrated in FIG. 5) may have access to the calculation. The provider will also create and send a debit note to the customer/user of the machine tool 10 automatically.

In order to avoid manipulation of the data characterizing the effective use of the machine tool 10, the control unit 18 is preferably configured to create a hash code value $H_i$ for each determined machine use characteristic parameter M. One machine use characteristic parameter M may be created after each pre-defined phase of time. The duration of such a phase of time may be between some milliseconds and some seconds. Preferably the duration of a phase of time is not longer than 1 or 2 seconds, but may also be shorter or longer as appropriate for a specific application. The control unit 18 may use a cryptographic hash function that can use a key as second input or that may be a keyless cryptographic hash function.

Figure 6:
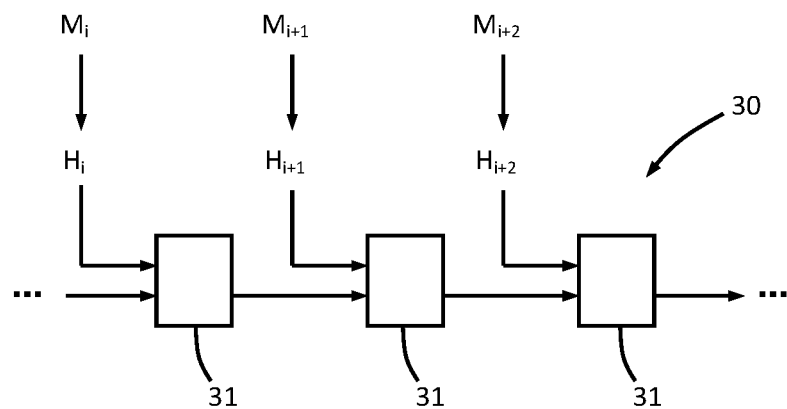

Because the machine use characteristic parameters M are transmitted to the external unit 20 (e.g. cloud), the external unit 20 is able to additionally calculate a hash code value $H_i$ using the same cryptographic hash function as the control unit 18 for each machine use characteristic parameter $M_i$. In the external unit 20 a block chain 30 may be created based on the calculated hash code values $H_i$. For each of the hash code values $H_i$ one block 31 of the block chain 30 is created as schematically illustrated in FIG. 6. For example after each phase of time one additional machine use characteristic parameter $M_i$ is provided and a respective hash code value $H_i$ is calculated and a further block 31 is added to the end of the block chain 30. In doing so, it is avoided that the data characterizing the effective use of the machine tool 10 may be manipulated during the further procedure.

One embodiment for the machine tool rent process is illustrated in FIG. 4.

In the first step S1 a rent contract is concluded between the provider of the machine tool 10 and a customer/user of the machine tool 10. In a second step S2 an initial fee FI is debited and preferably directly debited from a prepaid customer account, before the machine tool 10 is installed at the customers' site.

The user is requested to credit the prepaid account for the use of the machine tool 10 for at least the next use period, e.g. for a use period of 100 hours, prior to the beginning of the use period.

During the operation of the machine tool 10 data that characterize the use of the machine tool 10 are collected in the machine tool 10 and the control unit 18 is configured to determine the machine use characteristic parameters $M_i$ periodically, e.g. at least every 1 or 2 seconds (third step S3).

In a fourth step S4 it is checked whether the effective use of the machine tool 10 approaches the end of the actual use period, e.g. whether the use period (e.g. 100 hours) has terminated. If this is not the case, the method steps back to the third step S3. Alternatively, if the actual use period has terminated the method continues in the fifth step S5 and the use-dependent fee FU is determined. The determined use-dependent fee FU can be directly debited from the prepaid account of the customer subsequently as indicated by the eighth step S8 in FIG. 4.

As an option prior to or after direct debiting of the use-dependent fee FU it can be checked whether the effective machine use of the machine tool 10 corresponds to a minimum machine use. For this the calculated use-dependent fee FU can be compared with a minimum fee $F_{min}$ in a sixth step S6. If the use-dependent fee FU is less than the minimum fee $F_{min}$, the user is informed about the situation in a seventh step S7. This information indicates that the user will probably not fulfil a predicted minimum use of the machine tool 10 during the total rent period, if the effective operation time of the machine tool 10 is not increased compared to the operation of the machine tool 10 so far. Measures can be committed that enable the user to more effectively use the machine tool 10, e.g. by reducing tooling times, by using the machine tool 10 in additional processes or the like.

As explained above, the eighth step S8 may be carried out directly after the fifth step S5 in an alternative embodiment of the method.

After debiting the use-dependent fee FU from the prepaid account of the user, it is possible to check in a ninth step S9 whether the account is still balanced for the next use period. In doing so, it can be checked whether a credit is available on the prepaid account that corresponds to the use of the machine tool 10 for the next use period. If this is not the case, the user is informed in a tenth step S10 and is requested to balance the prepaid account for the next use period. Otherwise the method directly continues in the eleventh step S11, during which it is checked whether the term of the rent has terminated.

The maximum term of the rent is defined in the contract and can be, for example, between 1 year and 5 years and preferably the maximum term of the rent is equal to 3 years. If in the eleventh step S11 it is determined that the concluded rent term has not yet been reached, the method steps back to the third step S3. Otherwise the machine tool 10 is uninstalled or removed from the customer site and a terminal fee FT is directly debited from the prepaid account of the customer.

The provider of the machine tool 10 is subsequently able and entitled to sell the machine tool 10 as a used machine. Since new machine tools 10 are often expensive, the rent of a new machine tool 10 during a first period of time and subsequently selling the used machine tool 10 may be advantageous for the provider and/or the user of the machine tool 10.

Alternatively to the embodiment of the method illustrated in FIG. 4, the terminal fee FT may not be due or may at least be reduced, if the user who rented the machine tool 10 is willing to buy the machine tool 10 such that the machine tool 10 must not be removed.

If the effective use of the machine tool 10 exceeds the minimum use or any other defined threshold the customer may be entitled to obtain a bonus at the end of the rent. If in the other hand the effective use of the machine tool 10 has not reached the minimum use the provider may be entitled to request a payment corresponding to the difference between the sum of the use-dependent fees paid so far and a total minimum use-dependent fee that corresponds to the agreed minimum use of the machine tool 10.

As also illustrated in FIG. 4 the total machine tool rent fee may include a periodic basic fee FB, e.g. a monthly basic fee FB as an option. In a thirteenth step S13 it can be checked whether a new month begins. In this case a basic fee FB may be debited from the prepaid customer account (fourteenth step S14). The method may be continued in the ninth step S9 after the fourteenth step S14.

The total machine tool rent fee may include all necessary maintenance, service and repairs of the machine tool 10 depending on the terms and/or conditions of the contract. Also the contract may contain an insurance against unintended damage of the machine tool 10 by the user.

Due to the creation of the block chain 30, manipulation of the debit note and particularly of the use-dependent fee FU is avoided. The block chain 30 allows to evaluate and check the machine use characteristic parameters $M_i$ based on which the use-dependent fee FU is determined.

The invention refers to a method for determination of an effective machine use of a machine tool 10, as well as a machine tool 10 that is configured for this purpose. The machine tool 10 has multiple machine axes 16 in order to move a workpiece 13 and/or a tool 12. A rotary drive 11 drives the workpiece 13 or the tool 12 rotatingly in order to remove material in case of an engagement between the tool 12 and the workpiece 13. A control unit 18 of the machine tool 10 is configured to determine a use duration characteristic parameter T and an output power characteristic parameter L and to determine therefrom a machine use characteristic parameter M. The use duration characteristic parameter T describes a duration during which the workpiece 13 is machined by the tool 12. The output power characteristic parameter L describes the applied or required power for this machining in order to effect the material removal at the workpiece 13. The machine use characteristic parameter M is provided as determination result by the control unit 18 of the machine tool 10, such that the machine use characteristic parameter M can be transmitted to an external unit 20 for further evaluation or processing.

LIST OF REFERENCE SIGNS 10 machine tool
11 rotary drive
12 tool
13 workpiece
14 tool spindle
15 workpiece clamping device
16 machine axes
17 machine base
18 control unit
19 memory
20 external device
25 first block
26 second block
27 third block
28 forth block
29 computing node
30 Block chain
31 block of the block chain
A1-An assessment element of the assessment matrix
AM assessment matrix
B damage condition
D1 first rotation axis
D2 second rotation axis
E input data FB monthly basic fee
FI initial fee
$F_{min}$ minimum fee
FT terminal fee
FU use-dependent fee
Hi hash code value
IK maintenance characteristic parameter
L output power characteristic parameter
M, $M_i$ machine use characteristic parameter
PE production result characteristic parameter
P1-Pn production element of the production matrix
PM production matrix
R tool rotation axis
S control signal
S1-S14 method step
T use duration characteristic parameter
V wear condition
W maintenance condition

The invention claimed is:

1. A method for determination of an effective machine use of a machine tool (10) comprising multiple machine axes (16) that are configured for moving a workpiece (13) and/or a tool (12), a rotary drive (11) configured for rotating the workpiece (13) or the tool (12) and a control unit (18), wherein the method comprises the following steps:
   determining a use duration characteristic parameter (T) that characterizes a duration during which the workpiece (13) is machined by the tool (12) by the control unit (18),
   determining an output power characteristic parameter (L) that characterizes a power applied for machining of the workpiece (13) by the control unit (18),
   determining a machine use characteristic parameter (M) that characterizes the effective machine use by using the use duration characteristic parameter (T) and the output power characteristic parameter (L) in the control unit (18) of the machine tool (10), and
   providing the machine use characteristic parameter (M) in the control unit (18) of the machine tool (10) for transmission to an external unit (20).

2. The method according to claim 1, wherein determining the use duration characteristic parameter (T) includes determining the duration during which the rotary drive (11) rotatingly drives the tool (12) or the workpiece (13) while concurrently a feed movement between the tool (12) and the workpiece (13) occurs.

3. The method according to claim 1, wherein determining the use duration characteristic parameter (T) includes determining the duration during which the rotary drive (11) rotatingly drives the tool (12) or the workpiece (13) and the tool (12) is in engagement with the workpiece (13).

4. The method according to claim 3, further comprising determining by the control unit a torque parameter characterizing the torque of the rotary drive (11) by evaluating whether the tool (12) is in engagement with the workpiece (13).

5. The method according to claim 1, further comprising forming by the control unit a production matrix (PM) with multiple production values (P1-Pn) that characterizes the use duration characteristic parameter (T) and the output power characteristic parameter (L), and
   multiplying by the control unit the production matrix (PM) with an assessment matrix (AM) in order to obtain a production result characteristic parameter (PE) that is considered for the determination of the machine use characteristic parameter (M).

6. The method according to claim 1, wherein determining the machine use characteristic parameter (M) includes consideration of at least one maintenance characteristic parameter (IK) characterizing the maintenance condition of the machine tool (10), wherein the maintenance characteristic parameter characterizes the wear condition (V) and/or a damage condition (B) and/or a maintenance condition (W) of the machine tool (10).

7. The method according to claim 6, further comprising determining by the control unit the maintenance condition (W) on the basis of a maintenance schedule stored in the control unit (18) of the machine tool (10).

8. The method according to claim 7, further comprising effecting a change of the maintenance characteristic parameter (IK) by the control unit based on a non-compliance of the maintenance intervals defined by the maintenance schedule for one or more components of the machine tool (10).

9. The method according to claim 6, further comprising registering in the control unit an activity and/or at least one exchanged component of the machine tool (10) during or after an executed maintenance, and
   effecting a change of the maintenance characteristic parameter (IK) in the control unit based on the activity or at least one exchanged component.

10. The method according to claim 6, further comprising monitoring by the control unit the wear condition (V) of at least one component of the machine tool (10), and
    determining by the control unit of the maintenance characteristic parameter (IK) based on actual wear of the at least one component of the machine tool (10).

11. The method according to claim 6, further comprising executing by the control unit (18) of the machine tool (10) a collision detection function in which at least one actual acceleration value is compared with a respective pre-defined limit value, and
    determining by the control unit the maintenance characteristic parameter (IK) based on the damage condition (B) of the machine tool, which is determined from the comparison of the at least one actual acceleration value with the respective pre-defined limit value.

12. The method according to claim 1, wherein the output power characteristic parameter (L) characterizes a rotary drive power of the rotary drive (11) and/or a feed power for a feed movement between the tool (12) and the workpiece (13).

13. The method according to claim 1, further comprising considering by the control unit for the determination of the output power characteristic parameter (L) and/or the use duration characteristic parameter (T) desired data for a completely machined workpiece (13) and/or actual data of a machined workpiece (13), as well as initial data of a non-machined workpiece (13).

14. The method according to claim 13, further comprising determining by the control unit (18) of the machine tool (10) a machining method progress based on the desired data for the completely machined workpiece (13) and/or the actual data of the machined workpiece (13), as well as the initial data of the non-machined workpiece (13), and
    determining by the control unit from the machining method progress the output power characteristic parameter (L) and/or the use duration characteristic parameter (T).

15. The method according to claim 13, further comprising determining by the control unit the output power characteristic parameter (L) and/or the use duration characteristic parameter (T) based on a material parameter characterizing the hardness of the material of the workpiece (13) to be machined.

16. The method according to claim 1, further comprising calculating a hash code value ($H_i$) for each machine use characteristic parameter (MO) using a cryptographic hash function by the control unit (18) and/or the external unit.

17. The method according to claim 16, further comprising creating a block chain (30) that contains one block (31) for each hash code value ($H_i$).

18. A machine tool (10) comprising:
multiple machine axes (16) that are configured for movement of a workpiece (13) and/or a tool (12),
a rotary drive (11) configured for rotating the workpiece (13) or the tool (12), and
a control unit (18), wherein the control unit (18) is configured to execute a method for determination of an effective machine use of the machine tool (10) that comprises the following steps:
determining a use duration characteristic parameter (T) that characterizes a duration during which the workpiece (13) is machined by the tool (12),
determining an output power characteristic parameter (L) that characterizes a power applied for machining the workpiece (13) during the use duration,
determining a machine use characteristic parameter (M) that characterizes the effective machine use by using the use duration characteristic parameter (T) and the output power characteristic parameter (L), and
providing the machine use characteristic parameter (M) in the control unit (18) of the machine tool (10) for transmission to an external unit (20).

19. A method for determination of a machine tool rent fee including a use-dependent fee based on an effective machine use of a machine tool (10) comprising multiple machine axes (16) that are configured for moving a workpiece (13) and/or a tool (12), a rotary drive (11) configured for rotating the workpiece (13) or the tool (12) and a control unit (18), wherein the method comprises the following steps:

determining a use duration characteristic parameter (T) that characterizes a duration during which the workpiece (13) is machined by the tool (12) by the control unit (18),
determining an output power characteristic parameter (L) that characterizes a power applied for machining of the workpiece (13) by the control unit (18),
determining a machine use characteristic parameter (M) that characterizes the effective machine use by using the use duration characteristic parameter (T) and the output power characteristic parameter (L) in the control unit (18) of the machine tool (10) and providing the machine use characteristic parameter (M) in the control unit (18) of the machine tool (10) for transmission to an external unit (20),
calculating the use-dependent fee (FU) based on the machine use characteristic parameter.

20. The method according to claim 19, further comprising calculating the use-dependent fee in the external unit (20) that is in communication with the control unit (18) of the machine tool (10).

21. The method according to claim 19, wherein the machine tool rent fee contains a monthly fee including the use-dependent fee (FU) and a monthly basic fee (FB) and the method further comprises directly debiting the monthly fee from a pre-paid account of a customer.

22. The method according to claim 19, wherein the machine tool rent fee contains an initial fee (FI) for installation of the machine tool (10) at a customer site and/or a terminal fee (FT) for removal of the machine tool (10) from the customer site.

23. The method according to claim 22, further comprising directly debiting the initial fee (FI) from a pre-paid account of a customer prior to the installation of the machine tool (10) at the customer site.

24. The method according to claim 22, further comprising directly debiting the terminal fee (FT) from a pre-paid account of a customer.

* * * * *